US006324041B1

(12) United States Patent
Goebel et al.

(10) Patent No.: US 6,324,041 B1
(45) Date of Patent: Nov. 27, 2001

(54) PROTECTION CIRCUIT FOR TRAVELING WAVE TUBES HAVING MULTIPLE INPUT TONES

(75) Inventors: Dan M. Goebel, Tarzana; David E. Lewis, Torrance; Ronglin Liou, Alhambra, all of CA (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/422,876

(22) Filed: Oct. 21, 1999

(51) Int. Cl.[7] ........ H02H 3/18
(52) U.S. Cl. ........ 361/87; 361/94; 361/97
(58) Field of Search ........ 361/87, 42, 93.1, 361/93.7, 94, 97, 112; 330/43; 315/3.5, 3.6

(56) References Cited

U.S. PATENT DOCUMENTS 3,890,545 * 6/1975 Rosen ........ 361/112
4,323,853 * 4/1982 Kurokawa ........ 330/43
4,745,369 * 5/1988 Wanninger ........ 330/43
5,932,971 8/1999 Goebel et al. .
5,942,852 8/1999 Goebel et al. .

* cited by examiner

*Primary Examiner*—Michael J. Sherry
(74) *Attorney, Agent, or Firm*—Terje Gudmestad

(57) ABSTRACT

A protection circuit (30) for a Traveling Wave Tube having multiple tone operation. The protection circuit (30) is a dual sensor (52, 54) arrangement. One sensor (52) is an operational amplifier circuit (56) having a short time constant and a high threshold current. The first sensor (52) provides protection against short time scale faults. The second sensor (54) is an operational amplifier circuit (58) having a time constant higher than the first sensor (52) and a lower current threshold than the first sensor (52) to provide protection against long time scale events. The two sensors (52 and 54) are logically "OR"ed with each other and eliminate spurious shutdowns and circuit damage.

12 Claims, 4 Drawing Sheets

PROTECTION CIRCUIT FOR TRAVELING WAVE TUBES HAVING MULTIPLE INPUT TONES

TECHNICAL FIELD

The present invention relates to a protection circuit for a traveling wave tube (TWT), and more particularly to a protection circuit for a traveling wave tube driven by multiple input tones.

BACKGROUND ART

An exemplary traveling wave tube (TWT) 100 is shown in FIG. 1. The elements of the TWT 100 are generally coaxially-arranged on along a TWT axis 102. The elements include an electron gun 104, a slow wave structure 106, a beam focusing arrangement 108 which surrounds the slow wave structure 106, a microwave signal input port 110 and a microwave signal output port 112 which are coupled to opposite ends of the slow wave structure 106, and a collector 114. A housing 116 is typically provided to protect the TWT elements.

In operation, the electron gun 104 injects a beam of electrons into the slow wave structure 106. The electron beam has a given power level. The beam focusing arrangement 108 guides the electron beam through the slow wave structure 106. A microwave input signal 118 is inserted at the input port 110 and moves along the slow wave structure 106 to the output port 112. The slow wave structure 106 causes the phase velocity (i.e. the axial velocity of the phase front of the signal) of the microwave signal to approximate the velocity of the electron beam.

As a result, the electrons of the beam are velocity modulated into bunches which interact with the slower microwave signal. In this process, kinetic energy is transferred from the electrons to the microwave signal causing the microwave signal to be amplified. The amplified signal is coupled from the output port 112 as a microwave output signal 120. After their passage through the slow wave detector 106, the electrons are collected in the collector.

Typically, an individual power supply (not shown) is associated with each TWT and the power supply delivers the necessary bias voltages and currents. Standard protection circuits for TWT's are included in an external power conditioning unit (EPC). The protect ion circuit detects excessive helix current and either rapidly turns off the voltages to the TWT, or shuts down the inverters in a switching power supply to remove the voltages from the TWT. The standard protection circuit is typically a simple voltage-level detector with a short time-constant integrator for monitoring the helix current across a sense state resistor with an integrating operational amplifier, a Schmidt trigger circuit, or both. The detector is designed to detect an arc, fault, or overdrive situation and limit the total energy (in joules) that can be delivered to the TWT in order to avoid damage to the internal electrodes.

Standard protection circuits are typically designed for a TWT driven by a single tone. However, in modern communication systems, it is more common to drive the TWT with multiple tones to increase utilization of the available bandwidth. Prior art protection circuits that use a second sensor, called line sensors, use the second sensor to measure input power to the power supply. The line sensor provides a very slow response and are only occasionally used.

Multiple tones cause large transient power fluctuations in the TWT, which results in complex helix current waveforms compared to single or two-tone operation. When a TWT is driven by multiple tones, the helix current fluctuates with the varying phase of the different tones. Even with a constant average output power, the varying phase of the tones causes large body currents which interfere with the standard protection circuit. The line sensor is not practical for helix applications because it is too slow to protect the helix from excessive helix current.

In order to use a standard protection circuit for a multiple-tone driven application, the sensitivity of the detector circuit must be reduced by raising the peak threshold level, increasing the time constant, or both. The de-sensitization avoids spurious shut down from the protection circuit mistaking multi-tone phase-up with fault situations. However, desensitizing the circuit can lead to excessive energy being delivered to the tube in the event of a fault and excessive average power in the TWT when it is operated with only a single tone.

SUMMARY OF THE INVENTION

The present invention is a protection circuit that protects a traveling wave tube from excessive helix current when the TWT is driven with multiple tones. The present invention independently detects the peak and average power levels associated with helix current interception in the TWT by a two-stage sense circuit. This allows the protection circuit to turn off the TWT in the appropriate situations, even in the presence of multiple tones and large helix current spikes.

The protection circuit of the present invention has two detectors. A first detector is designed for the signature of arcs or high voltage faults which have fast rise times and high peak values of the helix current. The second detector is designed to limit the average power loading on the electrodes associated with the normal operation of a TWT. Average power loading has long time constants and lower helix currents.

The dual sensor circuit eliminates spurious shutdowns and circuit damage that is caused by desensitized single stage detector. Safe operation with a plurality of tones and continuous-random-variation of the phase signals can be accomplished with the protection circuit of the present invention.

It is an object of the present invention to protect a TWT from excessive helix current when the TWT is driven by multiple tones. It is another object of the present invention to independently detect peak and average power levels associated with TWT helix current.

It is a further object of the present invention to have a dual sensor protection circuit. It is yet a further object of the present invention to have a first detector designed to limit the peak power loading, and a second detector to limit average power loading.

Other objects and features of the present invention will become apparent when viewed in light of the detailed description of the preferred embodiment when taken in conjunction with the attached drawings and appended claims.

BEST MODES(S) FOR CARRYING OUT THE INVENTION

Figure 1:
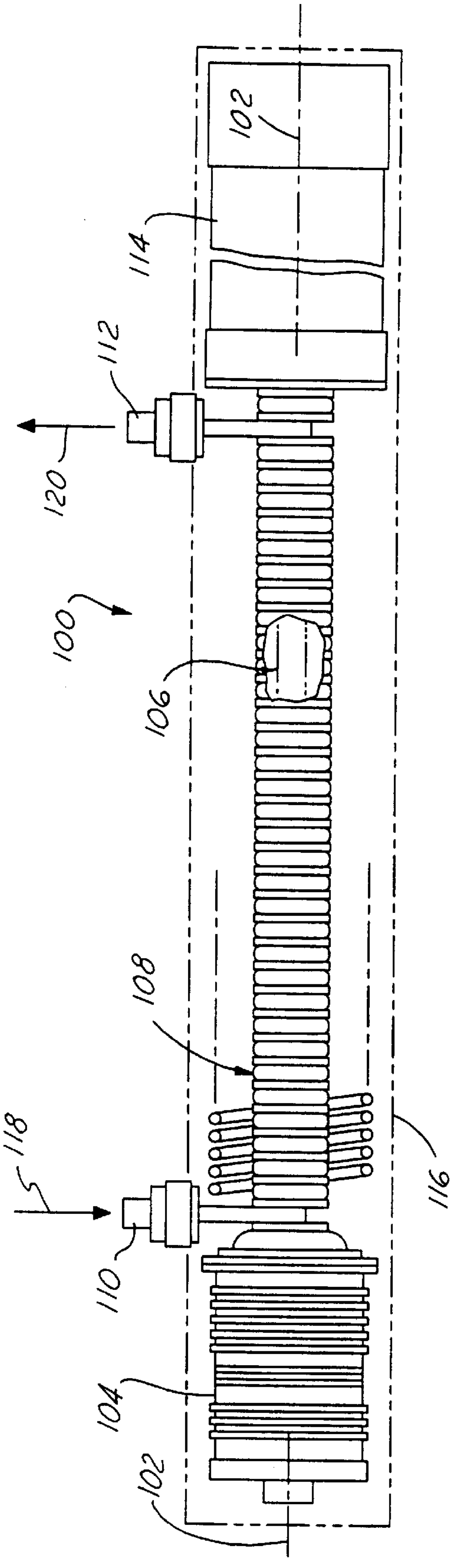
(PRIOR ART) FIG. 1
FIG. 1 is a side view, shown in partial cutaway, of a traveling wave tube amplifier.
Figure 2:
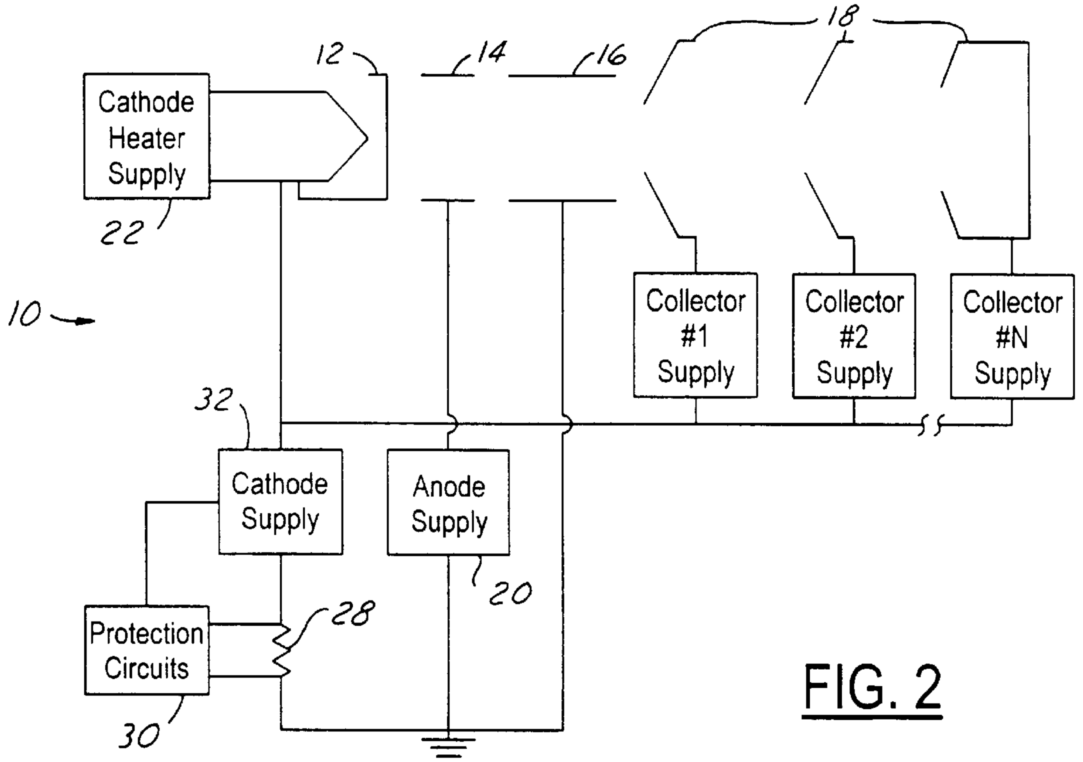
FIG. 2 is a schematic of one example of a power supply circuit for a TWT.
Figure 3:
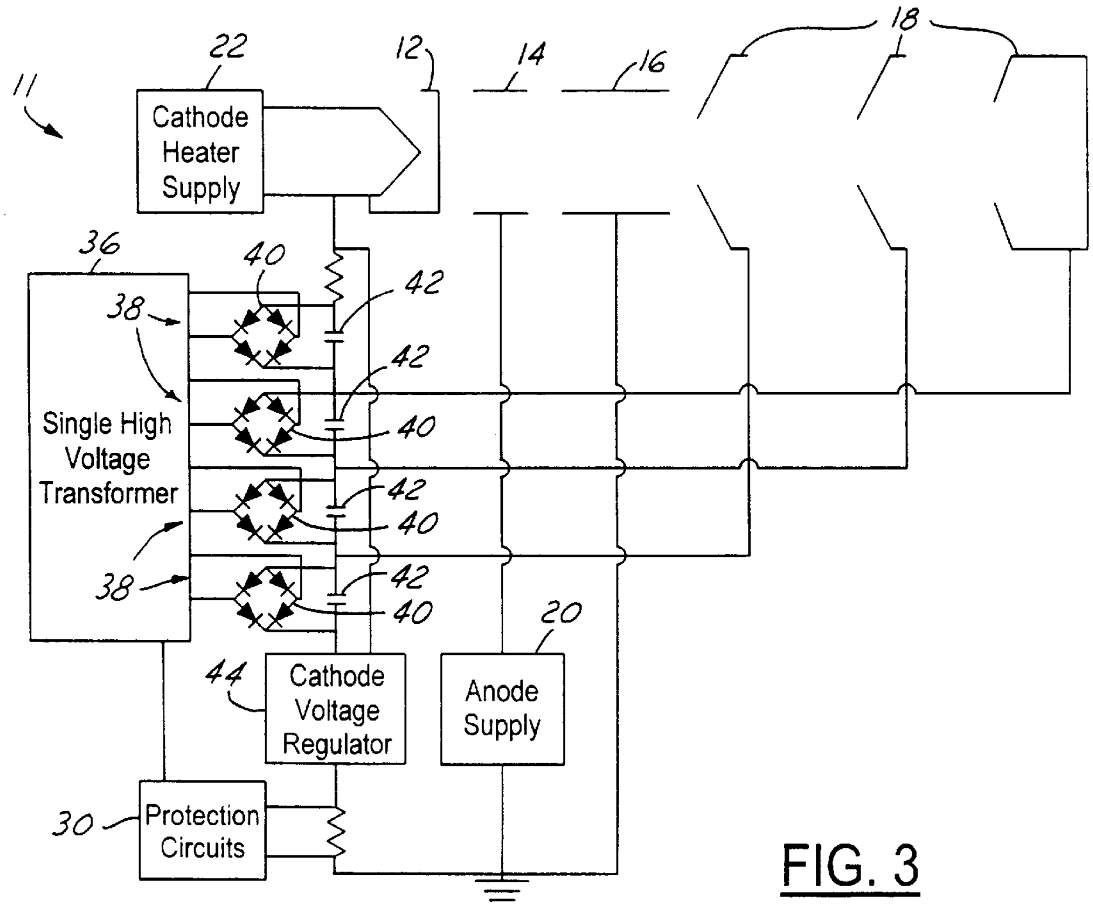
FIG. 3 is a schematic of another example of a power supply circuit for a TWT.

Traveling Wave Tubes (TWT) require several different voltages to be applied to its internal electrodes in order to amplify microwave signals and operate efficiently. There are a variety of circuits available for providing these voltages and currents. FIGS. 2 and 3 are examples of typical power supply configurations, 10 and 11 respectively. FIGS. 2 and 3 show a cathode 12 of a TWT, an anode 14, a body 16, and three depressed electron collectors 18. It should be noted that while three collectors are shown, the present invention is not limited to applications involving three collectors and it is possible to use any number of collectors. An anode supply 20 and a cathode heater supply 22 are also shown. A sense resistor 28 is placed near ground potential and a protection circuit 30 monitors the voltage across the resistor.

FIG. 2 is an example of a single cathode-voltage power supply 10. A single cathode supply 32 is used, and a plurality of separate power supplies 34 are floated at the cathode potential. The plurality of separate power supplies 34 provide voltages to the depressed electron-beam collectors 18.

FIG. 3 is an example of a power supply circuit 11 for providing voltages to a TWT with three collector stages 18. A cathode supply transformer 36 has several secondary taps 38. Each secondary tap 38 has a rectifier component 40 and a capacitor component 42 associated therewith. This arrangement, in combination with a cathode voltage regulator 44 produce several DC voltages that are used to provide the bias for the three stage depressed electron collectors 18.

In either example, the protection circuit 30 used in the prior art is typically an operational amplifier (not shown) that monitors the voltage across the sense resistor 28. The voltage across the sense resistor 28 is proportional to the amount of beam current that hits the body 16 in the TWT. The protection circuit 30 in the prior art usually includes an integrator circuit (not shown) to filter out high frequency noise and permit some short duration transient excursions to occur without shutting down the power supply. The sensitivity of prior art protection circuits, determined by the time constant of the integrator and the reference level of the operational amplifier, determines the amount of energy that is allowed to be deposited in the TWT in the event of a fault. Depending on the size and power handling characteristics of the TWT, energy levels of 0.1 to 10 joules are allowed.

When multiple tones are used to drive the TWT, the varying phase causes a time-dependent change in the instantaneous electric field in the TWT, which modifies the helix current sensed by the protection circuit 30. Depending on the number of tones, and the phase of the tones, the signal measured across the sense resistor 28 will contain large, varying current spikes of short duration. While the average power level of the TWT output and the average power dissipation in the TWT may not change significantly, the large helix current oscillations associated with multiple tones appears as a fault condition to the protection circuit 30.

Figure 4:
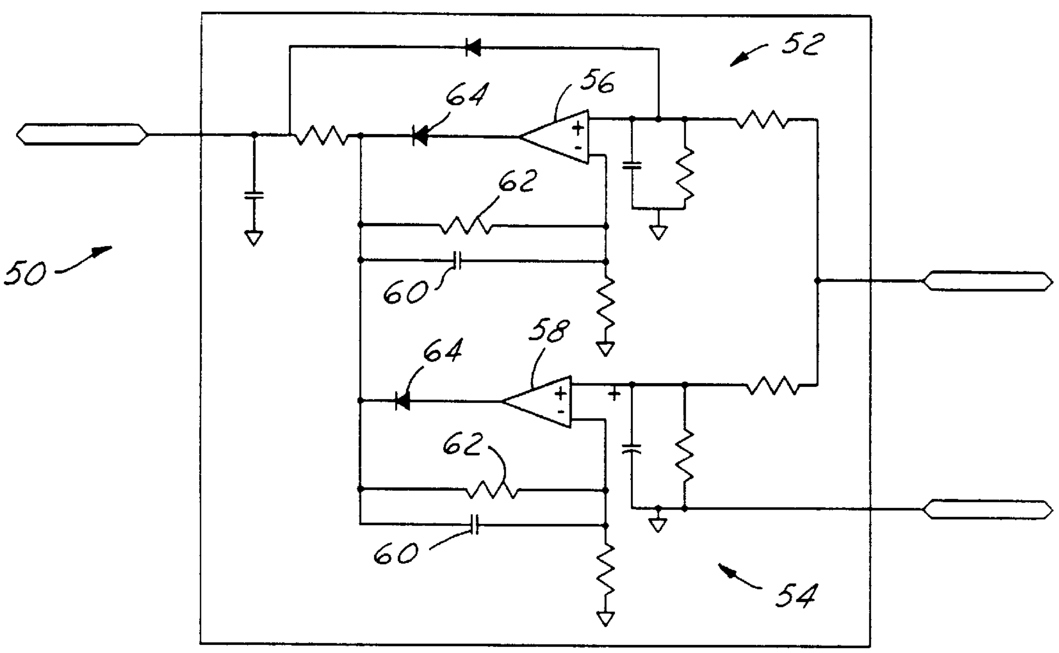
FIG. 4 is a schematic of the protection circuit of the present invention.

A schematic representation of the protection circuit 30 of the present invention is shown in FIG. 4. A dual sensor arrangement of two operational amplifiers monitoring the voltage across the sense resistor (not shown in FIG. 3) is provided. A first sensor 52 is designed to have a time constant and peak current that is different from the time constant and peak current for a second sensor 54. The two sensors 52 and 54 are tied together by a logic "OR" function so that the voltages on the TWT, either a high current or a long-time-scale power condition, can be removed before damage occurs.

The first sensor 52 has a time constant and peak current level that will detect rapid fault situations and protect the TWT from arcing. The second sensor 54 has a longer time constant and a lower peak threshold level such that the long-time-scale power (or energy) deposited on the TWT components does not damage the TWT. The values set for the time constants and current thresholds are determined by the power and energy handling characteristics of the TWT.

The first sensor 52 is called a fast response stage and, in the present example, the operational amplifier 56 circuit has a time constant of 1.3 msec. and a peak threshold value of 30 mA. The second detector 54, or slow response stage, has an operational amplifier 58 circuit having a time constant of 750 msec and a threshold value of 18 mA. A sudden increase in the helix current over 30 mA will be detected by the first detector 52 and will cause the power supply to be turned off if the spike in current lasts for longer than 1.3 msec. The second detector 54 will protect the TWT against average power overload should the helix current remain below 18 mA for longer than 750 msec.

Both detector circuits 52 and 54 have capacitors 60 across feedback resistors 62 so that two different and independent time constants can be obtained. By utilizing the capacitors 60 across the feedback resistors 62, the error-induced loading on the sense resistor due to the presence of the sensors 52 and 54 consists of simply a large resistance and no capacitance.

As discussed above, the two sensors are isolated from each other in a logic arrangement through diodes 64. The diodes 64 are placed within the feedback loops of the operational amplifiers 56 and 58 so that all of the diode forward drop is canceled out, which results in minimal error in sensing the voltage across the sense resistor.

Figure 5:
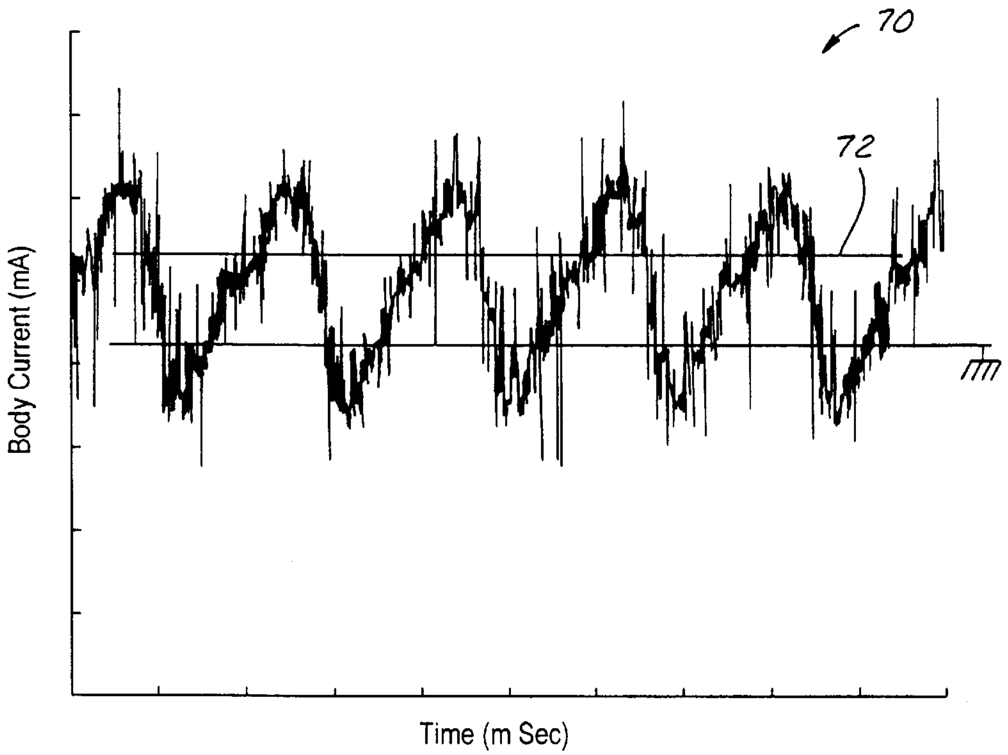
FIG. 5 is a graph of the helix current across a sense resistor for operation of a TWT at 126 Watts of average output power consisting of two tones separated by 1 MHz.

An example of the helix current measured across the sense resistor for a TWT producing an average of 126 Watts of power in two tones 70 is shown in FIG. 5. The helix current oscillates due to the electric field of the two tones constructively and destructively interfering in the tube as a function of time associated with the different frequency and phase of the tones. The average helix current 72, in this example, is about 5 mA, and the peak current is about 10 mA.

Figure 6:
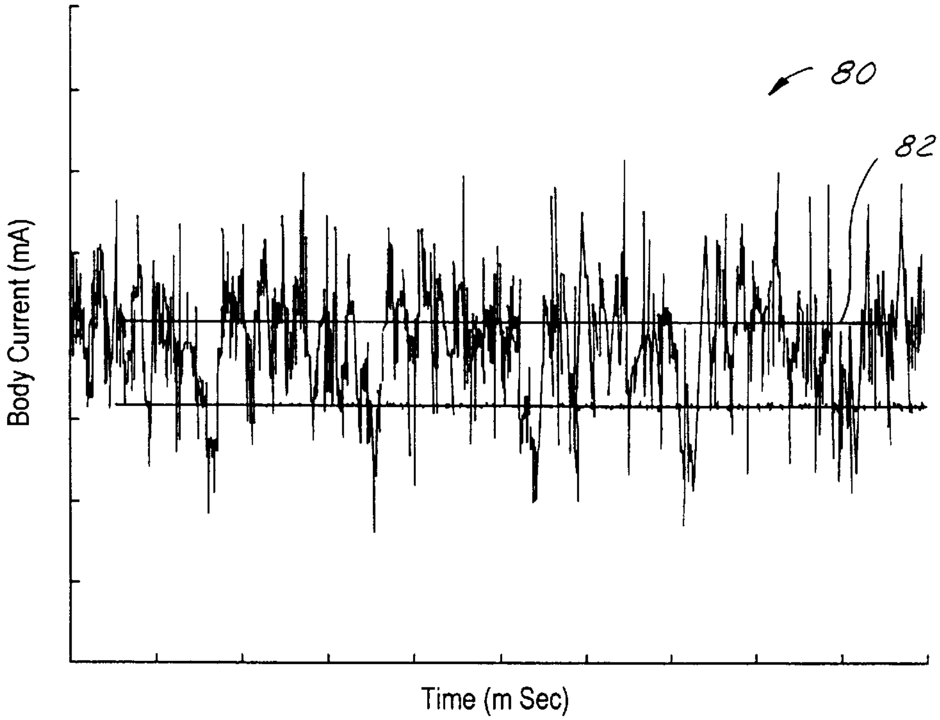
FIG. 6 is a graph of the helix current measured across the sense resistor for operation of a TWT at 126 Watts of average output power consisting of eight tones separated by 1 MHz.

An example of the signal measured across the sense resistor during 8-tone operation of the TWT at the same average output power level of 126 Watts 80 is shown in FIG. 6. This produces fast spikes with an amplitude of 2 to 3 times the average helix current 82, which is 7 mA in the present example. The phases of the different tones have been selected to minimize the peak electric field in the TWT.

Figure 7:
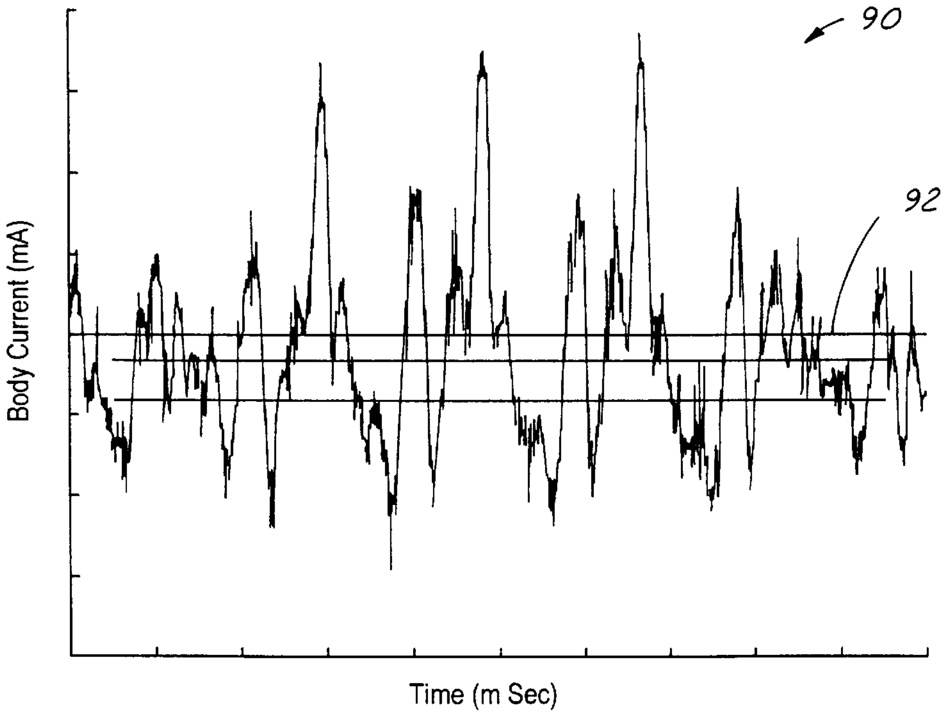
FIG. 7 is a graph of the helix current measured across the sense resistor for operation at 126 Watts of average output power consisting of eight tones with continuously varying phase and separated by 1 MHz.

FIG. 7 is an example of the voltage across the sense resistor when the phases of the different tones are randomly varied by a tone generator at a rate of eight times a second 90, (which is an industry standard for testing communication amplifiers). When the phase of the 8 tones is correct, the electric field of the signals in the TWT constructively interfere and result in a large instantaneous field in the TWT, which causes an increase in the helix current from the average level 92 of 9 mA to over 30 mA.

The continuous changing of the phase at 8 Hz means that the TWT must occasionally handle these high electric fields and helix currents associated with the constructive addition of multiple tones when the phase is correct, known as "phase stackup", for a duration of at least 125 msec. Since the undesirable phase condition statistically can occur immediately again, the TWT must actually handle several of these events for a time of nearly half a second.

The prior art single op-amp sense circuit must be desensitized by increasing the integration time, the threshold reference level, or both so as to not trip on the high peak current spikes discussed with reference to FIG. 7. Desensitizing the circuit prevents the TWT from being adequately protected for single or even two-tone operation because the trip levels are set to high to protect the tube. Implementing the dual sensor protection circuit 30 of the present invention eliminates both spurious shut downs and circuit damage that plagues a de-sensitized single-stage detector of the prior art. The dual sensor circuit 30 of the present invention allows safe operation without spurious shut-downs and has been accomplished with up to 16 tones with continuous-random-variation of the phase of the signals into the TWT.

While particular embodiments of the invention have been shown and described, numerous variations and alternate embodiments will occur to those skilled in the art. Accordingly, it is intended that the invention be limited only in terms of the appended claims.

What is claimed is:

1. A protection circuit for a TWT having multiple tone operation, said circuit comprising:

a first stage sensor having a predetermined time constant and a predetermined current threshold; and a second stage sensor isolated from said first stage sensor by a logic "OR" arrangement, said second stage sensor having a predetermined time constant and a predetermined current threshold that is different from said predetermined time constant and said predetermined current threshold for said first stage sensor.

2. The protection circuit as claimed in claim 1 wherein said first and second stage sensors are isolated from each other by diodes.

3. The protection circuit as claimed in claim 1 wherein said first stage sensor has an operational amplifier circuit designed such that said time constant is low and said threshold current is high relative to operating conditions for said TWT, and said second stage sensor has an operational amplifier circuit designed such that said time constant is higher than said time constant for said first stage sensor and said threshold current is lower than said threshold current for said first stage sensor.

4. The protection circuit as claimed in claim 3 wherein said operational amplifier circuits further comprise resistors in a feedback loop, said resistors having capacitors connected across them for implementing separate and distinct time constants for said first and second stage sensors.

5. The protection circuit as claimed in claim 4 wherein said feedback loops for said first and second stage sensors further comprise said diodes for isolating said first and second stage sensors.

6. A dual sensor protection circuit for a TWT having multiple tone operation, said dual sensor protection circuit comprising:

a first sensor having a fast response defining a first predetermined time constant; and a second sensor, logically "OR" ed with said first sensor, said second sensor having a slow response defining a second predetermined time constant.

7. The dual sensor protection circuit as claimed in claim 6 further comprising:

a first operational amplifier having a feedback loop, a first resistor in said feedback loop of said first operational amplifier;

a first capacitor across said first resistor for implementing a first time constant;

a first diode in said feedback loop of said first operational amplifier;

a second operational amplifier having a feedback loop;

a second resistor in said feedback loop of said second operational amplifier;

a second capacitor across said second resistor for implementing a second time constant, whereby said second time constant is longer than said first time constant; and a second diode in said feedback loop of said second operational amplifier whereby said first and second diodes provide said logic "OR" connection between said first and second operational amplifiers.

8. A traveling wave tube mechanism comprising:

an electron gun configured to generate an electron beam;

a slow wave structure positioned so that the electron beam passes through said slow wave structure;

a beam focusing structure arranged to confine the electron beam within the slow wave structure;

a collector for collecting the electron beam;

a power supply for applying voltages to said electron gun; and a protection circuit for said TWT comprising:

a first stage sensor having a predetermined time constant and a predetermined current threshold; and a second stage sensor isolated from said first stage sensor by a logic "OR" arrangement, said second stage sensor having a predetermined time constant and a predetermined current threshold that is different from said predetermined time constant and said predetermined current threshold for said first stage sensor.

9. The traveling wave tube mechanism as claimed in claim 8 wherein said first and second stage sensors are isolated from each other by diodes.

10. The traveling wave tube mechanism as claimed in claim 8 wherein said first stage sensor has an operational amplifier circuit designed such that said time constant is low and said threshold current is high relative to operating conditions for said TWT, and said second stage sensor has an operational amplifier circuit designed such that said time constant is higher than said time constant for said first stage sensor and said threshold current is lower than said threshold current for said first stage sensor.

11. The traveling wave tube mechanism as claimed in claim 10 wherein said operational amplifier circuits further comprise resistors in a feedback loop, said resistors having capacitors connected across them for implementing separate and distinct time constants for said first and second stage sensors.

12. The traveling wave tube mechanism as claimed in claim 11 wherein said feedback loops for said first and second stage sensors further comprise said diodes for isolating said first and second stage sensors.

* * * * *